United States Patent [19]

O'Brien et al.

[11] Patent Number: 5,649,242

[45] Date of Patent: Jul. 15, 1997

[54] MULTI-LAMP FLASH WHEEL AND CAMERA

[75] Inventors: Michael Joseph O'Brien, Rochester; Robert Cooper Bryant, Honeoyle Falls; Richard Alexander Colleluori, Rochester, all of N.Y.

[73] Assignee: Eastman Kodak Company, Rochester, N.Y.

[21] Appl. No.: 642,138

[22] Filed: May 2, 1996

[51] Int. Cl.⁶ .................................. G03B 15/04; F21K 5/00
[52] U.S. Cl. ........................... 396/191; 396/200; 362/14; 362/16; 431/359
[58] Field of Search ..................................... 354/142, 143, 354/144, 148; 362/11, 13, 14, 16; 431/359, 360, 362, 365; 396/191, 192, 193, 197, 200

[56] References Cited

U.S. PATENT DOCUMENTS

| | | | |
|---|---|---|---|
| 2,622,188 | 12/1952 | Seeger et al. | 362/14 |
| 3,517,182 | 6/1970 | Brooks et al. | 240/1.3 |
| 3,537,805 | 11/1970 | Michatek | 431/93 |
| 4,098,565 | 7/1978 | Van de Weijer | 431/93 |
| 4,298,808 | 11/1981 | English et al. | 362/14 |
| 4,347,053 | 8/1982 | Fohl et al. | 431/359 |

*Primary Examiner*—A. A. Mathews
*Attorney, Agent, or Firm*—Roger A. Fields

[57] ABSTRACT

In a camera, a circular array of flash lamps is arranged radially with respective ignition ends of the lamps closer to one another than respective opposite ends of the lamps. Each one of the lamps has respective ignition stems projecting from the ignition ends of the lamps to be struck to ignite the lamps. A one-piece reflector ring is located behind the circular array of lamps with respective disk portions of the reflector disk extending radially over each one of the lamps between the ignitions ends and opposite ends of the lamps to reflect flash illumination from the lamps non-radially. A one-piece striker ring is located behind the reflector ring and has respective striker fingers extending radially over the lamps for striking the ignition stems of the lamps. The circular array of flash lamps, the reflector disk and the striker ring are supported for simultaneous rotation to position respective trios of the lamps, the disk portions and the striker fingers successively behind a flash emission window.

9 Claims, 7 Drawing Sheets

5,649,242

1

MULTI-LAMP FLASH WHEEL AND CAMERA

FIELD OF THE INVENTION

The invention relates generally to the field of photography, and in particular to a multi-lamp flash wheel and to a camera including the multi-lamp flash wheel.

BACKGROUND OF THE INVENTION

It is known for a camera to be used with a multi-lamp flash wheel.

For example, prior art U.S. Pat. No. 4,098,565 issued Jul. 4, 1978 discloses a multi-lamp flash wheel in which the flash lamps are arranged radially in a circular array with respective ignition ends of the lamps being relatively close to one another and respective opposite ends of the lamps being relatively far from one another. The circular array of flash lamps is rotated inside a camera to advance the lamps successively into a slot-like recess at the front of the camera. Each one of the lamps is positioned in the recess with its opposite end protruding radially from the recess. A fixed, faceted reflector at opposite sides of the recess reflects flash illumination substantially radially from the lamp in the recess. A percussion spring is located to strike an ignition stem or ferrule of the lamp in the recess to ignite the lamp.

Somewhat similarly, prior art U.S. Pat. No. 4,347,053 issued Aug. 31, 1982 discloses a multi-lamp flash wheel in which the flash lamps are arranged radially in a circular array with respective ignition ends of the lamps being relatively close to one another and respective opposite ends of the lamps being relatively far from one another. In this instance, each one of the lamps is located in a separate combustion chamber The rear of the chamber has a reflective coating which works in combination with a fixed reflector in a camera, when the circular array of flash lamps is rotated to advance the chambers successively to the fixed reflector, to reflect flash illumination substantially radially from the chambers.

SUMMARY OF THE INVENTION

According to one aspect of the invention, a multi-lamp flash wheel comprises:

a circular array of flash lamps arranged radially with respective ignition ends of the lamps closer to one another than respective opposite ends of the lamps, and each one of the lamps having an ignition stem projecting from the ignition end of the lamp to be struck to ignite the lamp; and a one-piece striker ring located behind the circular array of flash lamps, and having respective striker fingers extending radially over the lamps for striking the ignition stems of the lamps.

According to a further aspect of the invention, a camera comprises:

a circular array of flash lamps arranged radially with respective ignition ends of the lamps closer to one another than respective opposite ends of the lamps, and each one of the lamps having respective ignition stems projecting from the ignition ends of the lamps to be struck to ignite the lamps;

a one-piece reflector ring located behind the circular array of lamps with respective disk portions of the reflector disk extending radially over each one of the lamps between the ignitions ends and opposite ends of the lamps to reflect flash illumination from the lamps non-radially;

2 a one-piece striker ring located behind the reflector ring, and having respective striker fingers extending radially over the lamps for striking the ignition stems of the lamps;

a flash emission window; and means supporting the circular array of flash lamps, the reflector disk and the striker ring for simultaneous rotation to position respective trios of the lamps, the disk portions and the striker fingers successively behind the window to reflect flash illumination from the lamps non-radially through the window.

DETAILED DESCRIPTION OF THE INVENTION

Figure 1:
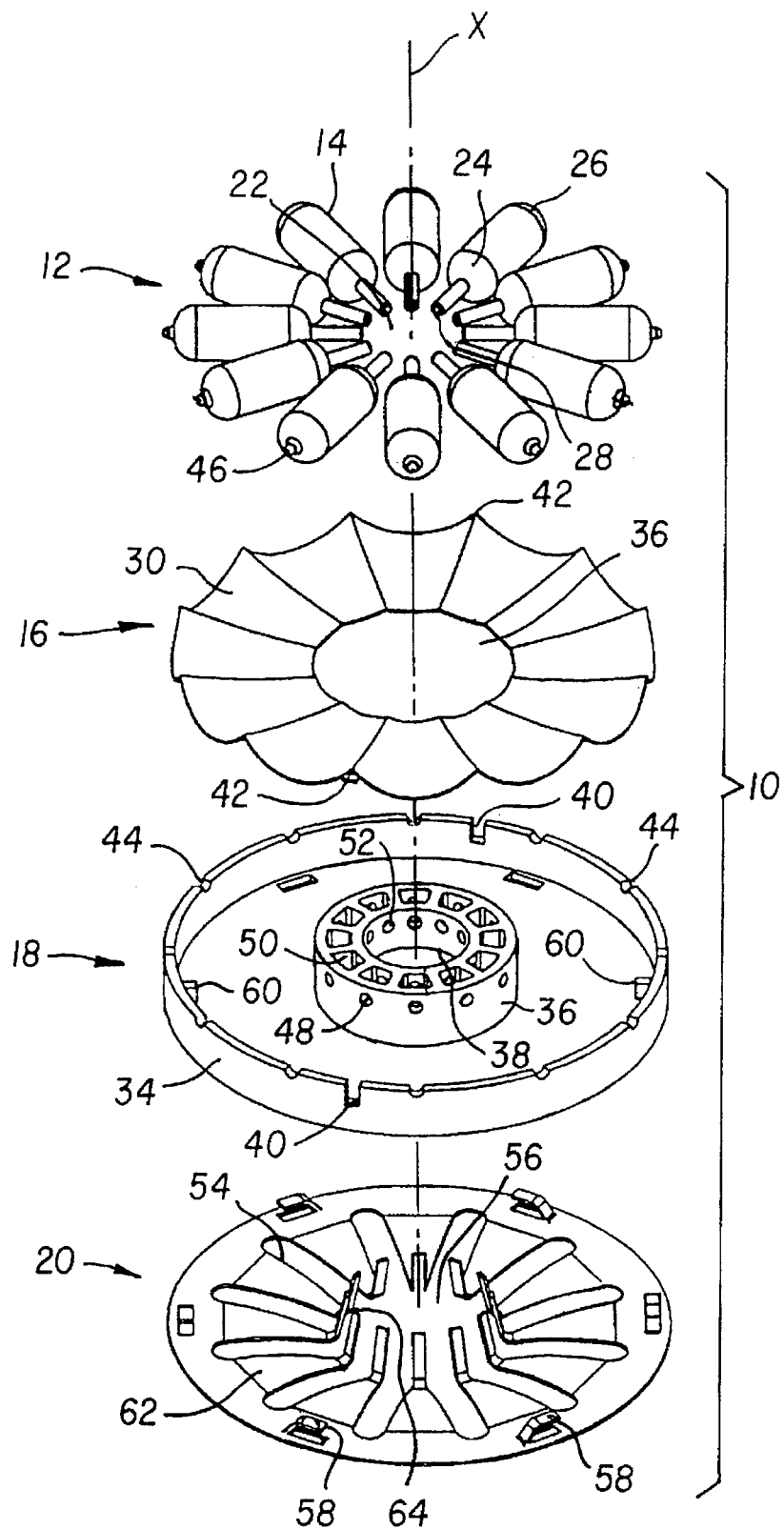
FIG. 1 is an exploded perspective view of a multi-lamp flash wheel consistent with a preferred embodiment of the invention.

The invention is disclosed as being embodied preferably in a multi-lamp flash wheel and in a camera which includes the multi-lamp flash wheel. Because the features of a multi-lamp flash wheel and a camera are generally known, the description which follows is directed in particular only to those elements forming part of or cooperating directly with the disclosed embodiment. It is to be understood, however, that other elements may take various forms known to a person of ordinary skill in the art.

The Multi-lamp Flash Wheel

Referring now to the drawings, FIGS. 1–4 show a multi-lamp flash wheel 10 comprising a circular array 12 of twelve percussive-ignitable flash lamps 14, a one-piece reflector disk 16, a one-piece intermediate support ring 18, and a one-piece striker ring 20. The circular array 12 of flash lamps 14, the reflector disk 16, the support ring 18 and the striker ring 20 are connected together for unitary rotation about a center axis X.

Figure 2:
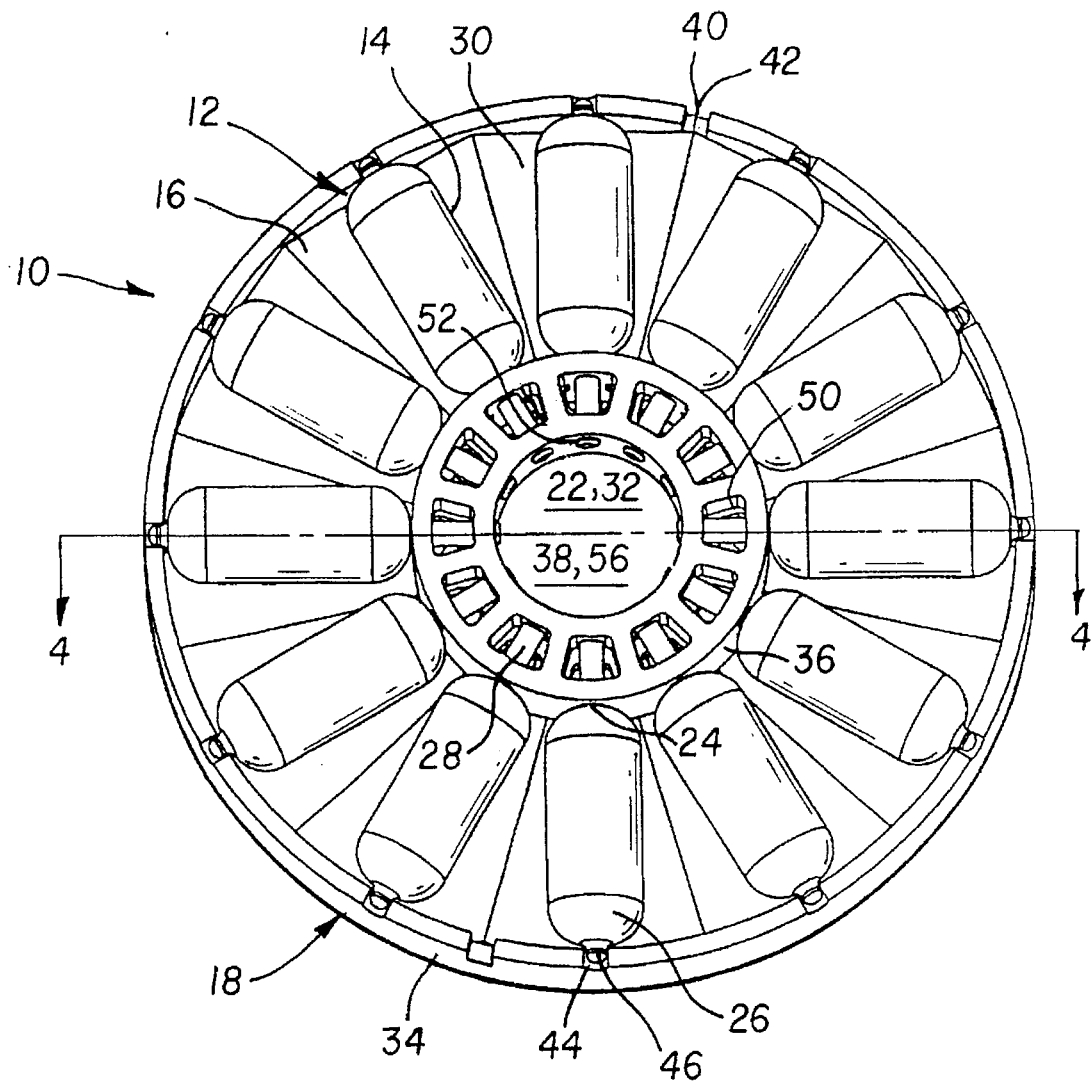
FIG. 2 is a is a top perspective view of the multi-lamp flash wheel.

The flash lamps 14 as shown in FIGS. 1 and 2 are arranged radially about a common center opening 22, with respective ignition (inner) ends 24 of the lamps relatively close to one another and respective opposite (outer) ends 26 relatively far from one another. Each one of the flash lamps 14 has an ignition stem or ferrule 28 projecting from the ignition end 24 of the lamp to be physically struck to ignite the lamp. The flash lamps 14 are a known chemical type in that they comprise a hermetically sealed transparent glass housing, a combustion-supporting gas fill such as oxygen inside the housing, a filamentary combustible material such as shredded zirconium or hafnium foil which is rapidly burned inside the housing to produce flash illumination, and a primer bead connected inside the housing to the ignition stem 28.

Figure 4:
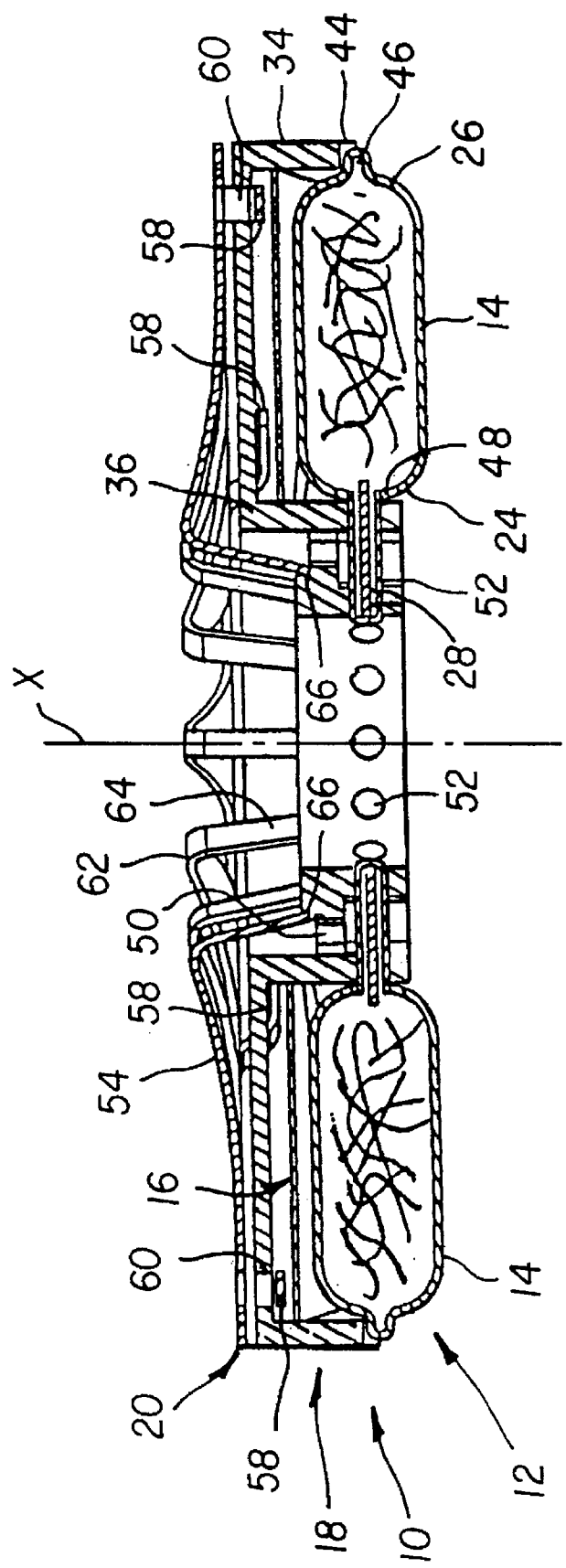
FIG. 4 is a cross-section view of the multi-lamp flash wheel as seen in the direction of the arrows 4—4 in FIG. 2.

The reflector disk 16 as shown in FIGS. 1 and 4 is located immediately behind the circular array 12 of flash lamps 14. Respective scalloped (concave) portions 30 of the reflector disk 16 extend radially over each one of the lamps 14 between the ignition (inner) ends 24 and opposite (outer) ends 26 of the lamps to reflect flash illumination from the lamps non-radially, i.e. from between the ignition (inner) ends and opposite (outer) ends of the lamps. The disk portions 30 are arranged radially about a center opening 32 of the reflector disk 16.

The support ring 18 is located immediately behind the reflector disk 16 and has an outer circumferential lip 34 and an inner annular collar 36 as shown in FIGS. 1,2 and 4, which surround a center opening 38. A pair of notches 40 in the circumferential lip 34 receive respective alignment tabs 42 of the reflector disk 16 to secure the reflector disk to the support ring 18 as shown in FIGS. 2 and 4. Respective notches 44 in the circumferential lip 34 receive glass beads 46 at the opposite (outer) ends 26 of the flash lamps 14 to secure the lamps to the support ring 18. At the same time, the ignition stems 28 of the lamps 14 extend through respective through-holes 48 in the annular collar 36, into respective open-bottom ignition holes 50 in the annular collar, and terminate in respective end holes 52 in the annular collar which open to the center opening 38 of the support ring 18.

Figure 3:
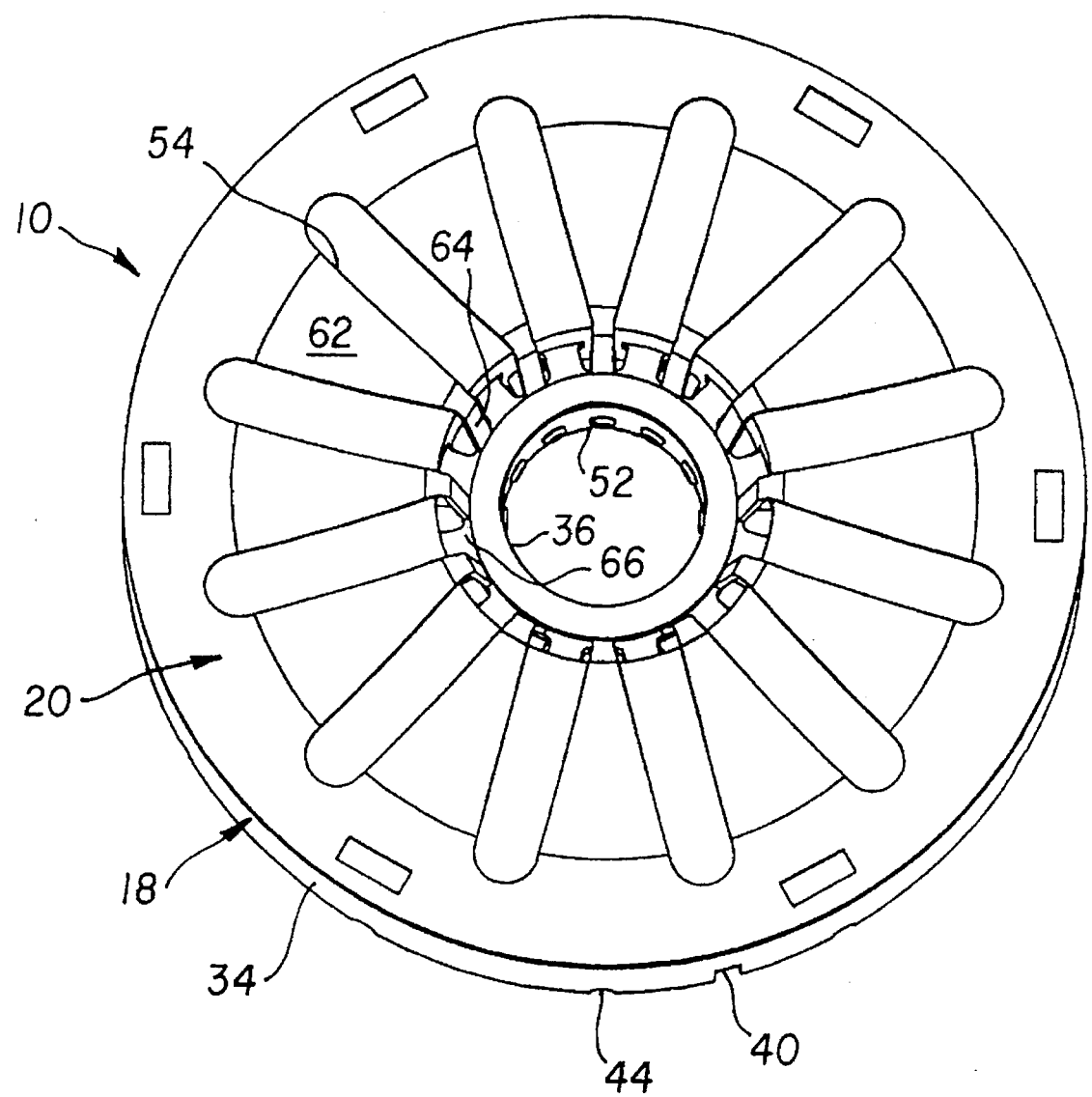
FIG. 3 is a bottom perspective view of the multi-lamp flash wheel.

The striker ring 20 is located immediately behind the support ring 18 and has twelve striker fingers 54 arranged radially about a common center opening 56 as shown in FIGS. 1, 3 and 4. Four punched-out locking tabs 58 of the striker ring 20 are received through respective through-holes 60 in the support ring 18 to secure the striker ring to the support ring. Each one of the striker fingers 54 has a flexible main portion 62 and a rigid end portion 64. The end portions 64 of the striker fingers 54 rest on an annular ledge 66 of the annular collar 36, adjacent the ignitions holes 50 in the collar, to individually be moved off the ledge into the ignition holes to strike the ignition stems 28 in the ignition holes and ignite the lamps 14.

The Camera

Figure 5:
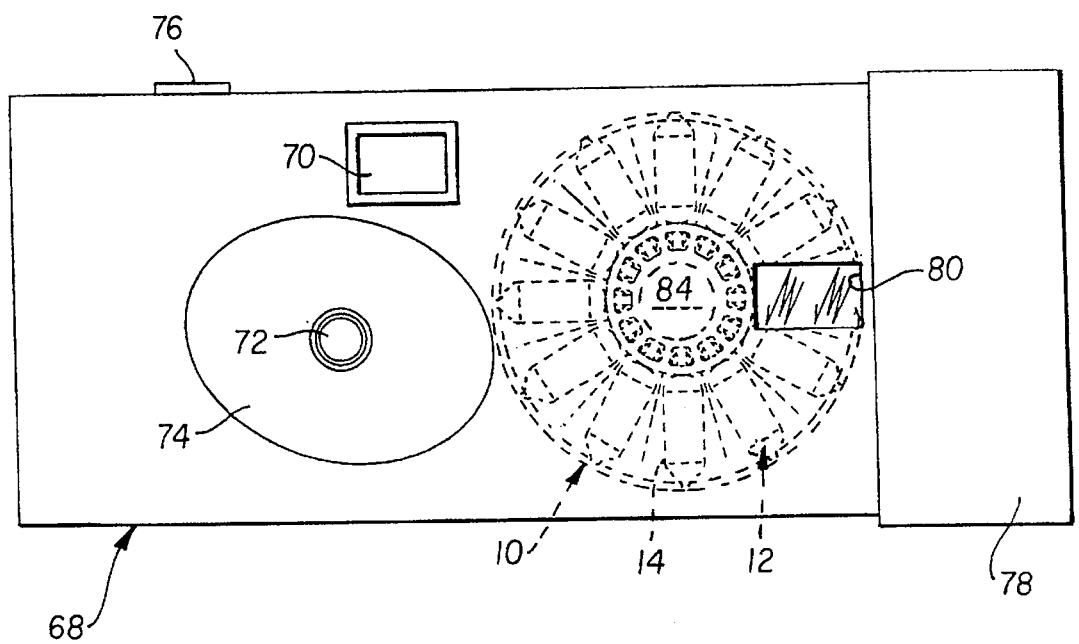
FIG. 5. is a front elevation view of a camera to be used with the multi-lamp flash wheel.
Figure 6:
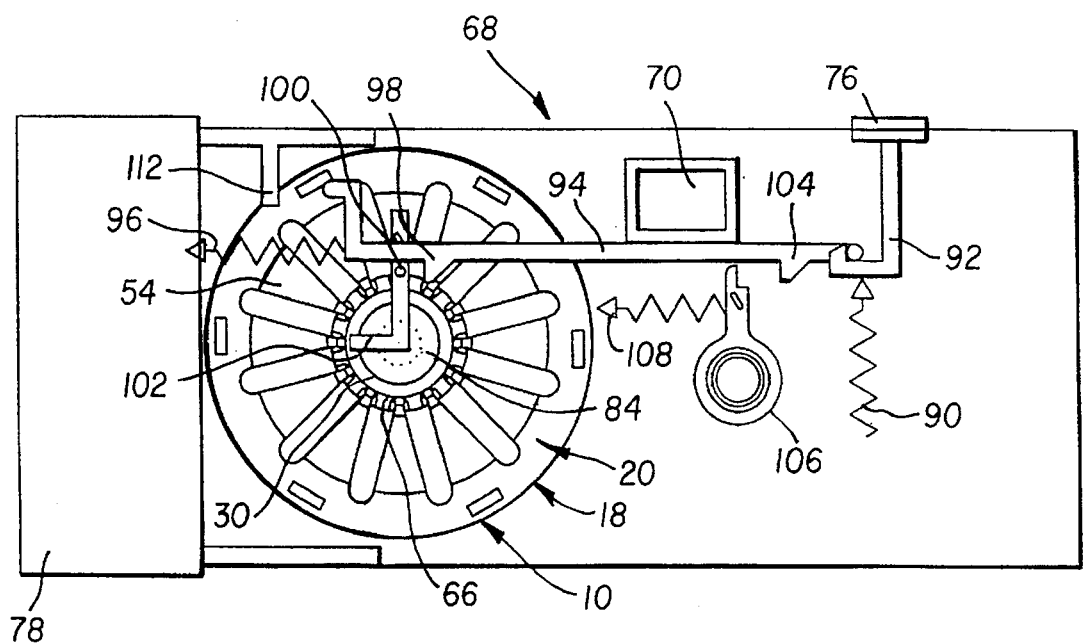
FIG. 6 is a rear elevation view of the camera with a rear cover removed to show a trigger means for igniting the lamps.
Figure 7:
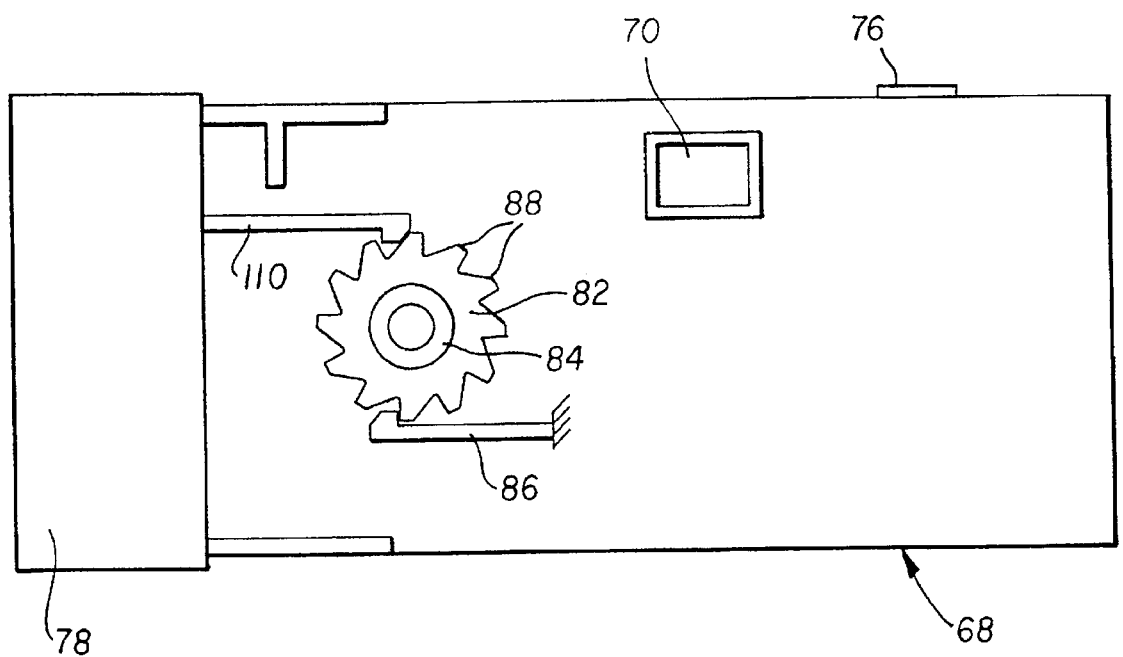
FIG. 7 is a rear elevation view of the camera with the rear cover removed to show an indexing means for the multi-lamp flash wheel.

A camera 68 which includes the multi-lamp flash wheel 10 is shown in FIGS. 5–7.

As shown in FIG. 5, the camera 68 has a front viewfinder window 70, a taking lens 72, a front lens bezel 74 surrounding the taking lens, a manually depressible shutter release button 76, an operating push handle 78 and a flash emission window 80.

A rotatably supported indexing wheel 82, shown in FIG. 7, has a center hub 84 which is received through the center opening 56 of the striker ring 20 and into the center opening 38 of the support ring 18 to support the multi-lamp flash wheel 10 for rotation about the axis X to move the flash lamps 14 successively behind the flash emission window 80. An anti-backup pawl 86 engages successive teeth 88 of the indexing wheel 82.

When the shutter release button 76 is manually depressed against the contrary urging of a return spring 90, a release stem 92 connected to the button is disengaged from a high-energy beam 94. The high energy beam 94, in turn, is urged via an actuation spring 96 to the left in FIG. 6, first moving an integral tab 98 of the beam against a stud 100 on a kicker pawl 102. The kicker pawl 102, in turn, is pivoted clockwise in FIG. 6, to kick an end portion 64 of a striker finger 54 off the annular ledge 66 and into an ignition hole 28 to strike an ignition stem 28 in the ignition hole and ignite a flash lamp 14. Then, an integral tab 104 of the beam 94 is moved against a shutter blade 106 to pivot the shutter blade counterclockwise against the contrary urging of a return spring 108 to momentarily uncover the taking lens 72 in timed relation with flash ignition.

To reset, the push handle 78 is moved to the right in FIGS. 6 and 7, first to make an indexing extension 110 of the push handle rotate the indexing wheel 82 one tooth increment to rotate the multi-lamp flash wheel 10, to move the flash lamp 14 that has been ignited from behind the flash emission window 80 and move a flash lamp that has not been ignited behind the flash emission window. Then, a reset extension 112 of the push handle 78 is moved to push the high-energy beam 94 to the right in FIG. 6 to re-position the kicker pawl 102.

The invention has been described with reference to a preferred embodiment. However, it will be appreciated that variations and modifications can be effected by a person of ordinary skill in the art without departing from the scope of the invention. For example, the flash lamps 14 can be any known flash illumination source such as a conventional flash bulb, a flash powder or solid encased in a transparent covering as disclosed in prior art U.S. Pat. No. 3,751,656, issued Aug. 3, 1973, etc.

PARTS LIST 10. multi-lamp flash wheel
12. circular array of flash lamps
14. flash lamps
16. reflector disk
18. support ring
20. striker ring
X. axis
22. center opening
24. ignition ends
26. opposite ends
28. ignition stem
30. scalloped disk portions
32. center opening
34. outer circumferential lip
36. inner annular collar
38. center opening
40. notches
42. alignment tabs
44. notches
46. glass beads
48. through-holes
50. ignition holes
52. end holes
54. striker fingers
56. center opening
58. locking tabs
60. through-holes
62. main finger portions
64. end finger portions
66. annular ledge
68. camera
70. front viewfinder window
72. taking lens
74. lens bezel
76. shutter release button
78. push handle
80. flash emission window
82. indexing wheel
84. center hub
86. anti-backup pawl
88. successive teeth
90. return spring 92. release stem
94. high-energy beam
96. actuation spring
98. tab
100. stud
102. kicker pawl
104. tab
106. shutter blade
108. return spring
110. indexing extension
112. reset extension

We claim:

1. A multi-lamp flash wheel comprising:

a circular array of flash lamps arranged radially with respective ignition ends of said lamps closer to one another than respective opposite ends of the lamps, and each one of said lamps having an ignition stem projecting from said ignition end of the lamp to be struck to ignite the lamp; and a one-piece striker ring located behind said circular array of flash lamps, and having respective striker fingers extending radially over said lamps for striking said ignition stems of the lamps.

2. A multi-lamp flash wheel as recited in claim 1, wherein said circular array of flash lamps surround a center opening which is radially inward of said ignition stems, said striker ring has a center opening radially inward of said striker fingers which is coaxially aligned with said center opening of said circular array of flash lamps.

3. A multi-lamp flash wheel as recited in claim 1, further comprising:

a one-piece support ring located between said circular array of flash lamps and said striker ring, and having an annular array of ignition holes that house said ignition stems of the lamps and an annular ledge supporting said striker fingers for movement off said ledge into said ignition holes to strike the ignition stems.

4. A multi-lamp flash wheel as recited in claim 3, wherein said circular array of flash lamps surround a center opening which is radially inward of said ignition stems, said striker ring has a center opening radially inward of said striker fingers which is coaxially aligned with said center opening of said circular array of flash lamps, and said support ring has a center opening radially inward of said annular ledge which is concentric with said center opening of said circular array of flash lamps.

5. A multi-lamp flash wheel as recited in claim 4, wherein said ignition ends of the lamps face said center opening of the support ring and said opposite ends of the lamps face a circumference of the support ring.

6. A multi-lamp flash wheel comprising:

a circular array of flash lamps arranged radially with respective ignition ends of said lamps closer to one another than respective opposite ends of the lamps, and each one of said lamps having respective ignition stems projecting from said ignition ends of the lamps to be struck to ignite the lamps;

a one-piece reflector ring located behind said circular array of lamps with respective disk portions of said reflector ring extending radially over each one of said lamps between said ignitions ends and opposite ends of the lamps to reflect flash illumination from the lamps non-radially; and a one-piece striker ring located behind said reflector ring, and having respective striker fingers extending radially over said lamps for striking said ignition stems of the lamps.

7. A camera comprising:

a circular array of flash lamps arranged radially with respective ignition ends of said lamps relatively close to one another and respective opposite ends of the lamps relatively far from one another;

a one-piece reflector disk located behind said circular array of flash lamps with respective disk portions of said reflector disk extending radially over each one of said lamps between said ignitions ends and opposite ends of the lamps to reflect flash illumination from the lamps non-radially;

a flash emission window; and means supporting said circular array of flash lamps and said reflector disk for simultaneous rotation to position respective pairs of said lamps and said disk portions successively behind said window to reflect flash illumination from the lamps non-radially through the window.

8. A camera comprising:

a circular array of flash lamps arranged radially with respective ignition ends of said lamps closer to one another than respective opposite ends of the lamps, and each one of said lamps having respective ignition stems projecting from said ignition ends of the lamps to be struck to ignite the lamps;

a one-piece striker ring located behind said circular array of lamps, and having respective striker fingers extending radially over said lamps for striking said ignition stems of the lamps;

a flash emission window; and means supporting said circular array of flash lamps and said striker ring for simultaneous rotation to position respective pairs of said lamps and said striker fingers successively behind said window to emit flash illumination radially from the lamps through the window.

9. A camera comprising:

a circular array of flash lamps arranged radially with respective ignition ends of said lamps closer to one another than respective opposite ends of the lamps, and each one of said lamps having respective ignition stems projecting from said ignition ends of the lamps to be struck to ignite the lamps;

a one-piece reflector ring located behind said circular array of lamps with respective disk portions of said reflector disk extending radially over each one of said lamps between said ignitions ends and opposite ends of the lamps to reflect flash illumination from the lamps non-radially;

a one-piece striker ring located behind said reflector ring, and having respective striker fingers extending radially over said lamps for striking said ignition stems of the lamps;

a flash emission window; and means supporting said circular array of flash lamps, said reflector disk and said striker ring for simultaneous rotation to position respective trios of said lamps, said disk portions and said striker fingers successively behind said window to reflect flash illumination from the lamps non-radially through the window.

* * * * *